E. J. VONDENBOSCH.
LAWN SPRINKLER.
APPLICATION FILED DEC. 13, 1915.
1,208,243.
Patented Dec. 12, 1916.
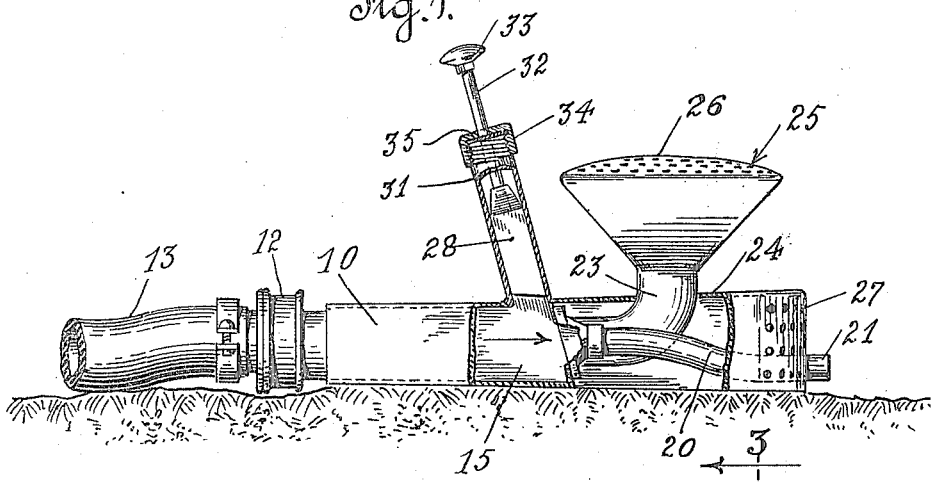
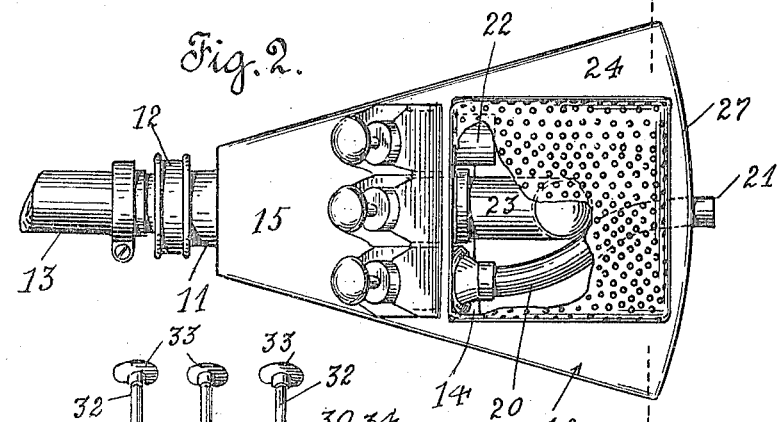
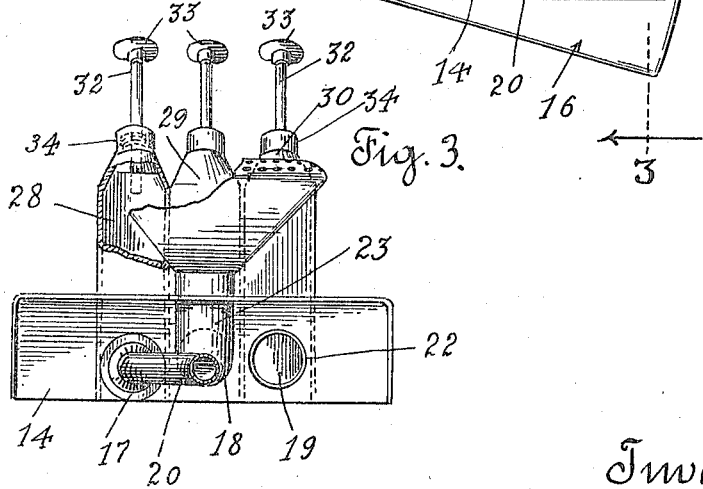
Inventor,
by Edward J. Vondenbosch
Hazard Berry & Miller
Attorneys

UNITED STATES PATENT OFFICE.

EDWARD J. VONDENBOSCH, OF LOS ANGELES, CALIFORNIA.

LAWN-SPRINKLER.

1,208,243.   Specification of Letters Patent.   Patented Dec. 12, 1916.

Application filed December 13, 1915. Serial No. 66,615.

*To all whom it may concern:*

Be it known that I, EDWARD J. VONDENBOSCH, a citizen of the United States, residing at Los Angeles, in the county of Los Angeles and State of California, have invented new and useful Improvements in Lawn-Sprinklers, of which the following is a specification.

My invention relates to a lawn sprinkler.

It is an object of this invention to construct a lawn sprinkler that may be connected to a hose and which is provided with three sets of sprinkling devices independently controlled by means of valves whereby the sprinkling devices may be operated singly or in unison.

It is another object of this invention to construct a lawn sprinkler whereby the water may be sprayed upwardly and laterally, and which is provided with a nozzle whereby a single stream of water may be directed as desired.

It is another object of this invention to construct a lawn sprinkler simple of construction, positive in operation and not likely to get out of order.

With these and other objects in view which will appear as the description proceeds, my invention consists in the construction and arrangements of parts hereinafter described and claimed.

In the accompanying drawings which form a part of this specification, I have illustrated a convenient and practical embodiment of my invention, and in which:

Figure 1 is a side elevation with parts broken away to show the internal structure of my improved lawn sprinkler. Fig. 2 is a top plan view thereof with parts of the top sprayer broken away. Fig. 3 is a vertical sectional view on lines 3—3 looking in the direction of the arrows of Fig. 2.

10 designates a flat chambered casing having substantially the shape of a sector of a circle. The narrow end of the casing 10 is provided with a tubular water inlet port 11, at the outer end of which a hose connection 12 detachably unites a hose 13 therewith.

Intermediate the ends of the casing 10 is a transverse partition wall 14 dividing the casing into a posterior water supply chamber 15 and an anterior spraying chamber 16. The partition wall 14 is provided with outlet ports 17, 18 and 19. A tubular conduit 20 leads from the port 17 to a point near the center of the curved lateral surface 27 of the lower spraying chamber 16 and ends in a tubular neck or nozzle 21 projecting therefrom. A short tubular neck 22 leads from the port 19 into the spraying chamber 16. A tubular conduit 23 leads from the middle port 18 and passes upwardly through the top wall 24 of the lower spraying chamber, terminating at the base of the top sprayer 25. This top sprayer has the shape of an inverted four-sided pyramid, with an upper convex surface 26. The convex surface 26 of the top sprayer, as well as the curved lateral face 27 of the water distributing chamber 16 are perforated and constitute the top and lateral spraying devices, respectively.

The ports 17, 18 and 19 are controlled by gate valves 28, 29 and 30, respectively, which are slidably mounted in a valve casing 31. The valves are provided with stems 32 having heads 33 at their upper ends, whereby said valves may be manually operated. Screw caps 34 surround the valve stems in which packing rings 35 are mounted, effect a water-tight closure at the upper end of said valve casing.

From the foregoing description, the operation of the lawn sprinkler will be easily understood. The lawn sprinkler being attached to a hose may be employed for spraying purposes as desired, and the lateral sprayer 27 and the top sprayer 26 and the central lateral nozzle 21 may be used singly or jointly, each spraying device being independently controlled by one of the manually operated gate valves. I prefer to have a square top sprayer 26. This shape of sprayer will throw the water in such a way that the sprinkling water will reach the corners of the rectangular lawn or field, although it will be understood that a round sprinkler may be substituted if so desired.

I do not confine myself to the specific form of the lawn sprinkler as shown and described, as various changes in the construction and arrangement of parts may be made by those skilled in the art without departing from the spirit of my invention as defined in the appended claims.

I claim:

1. A lawn sprinkler comprising a casing having a posterior supply chamber adapted to be connected to a source of water under pressure and an anterior spraying chamber, said spraying chamber being provided with a perforated lateral wall, a conduit leading from said supply chamber to said spraying chamber, a top sprayer provided with an upper perforated wall, a second conduit leading from said supply chamber to said top sprayer, a third conduit leading from said supply chamber to the perforated wall of said lower spraying chamber, said last named conduit terminating in a nozzle projecting outwardly from said last named wall, and manually operated valves for independently controlling said conduits.

2. A lawn sprinkler comprising a casing having a posterior water supply chamber and an anterior spraying chamber, a conduit leading from said supply chamber to said spraying chamber, said spraying chamber being provided with a perforated lateral wall, a top sprayer provided with a square perforated wall, a second conduit leading from said supply chamber to said top sprayer, a third conduit leading from said supply chamber to said perforated lateral wall, said last named conduit terminating in a nozzle, and manually operated valves for controlling said conduits.

3. A lawn sprinkler comprising a casing having a water supply chamber and a spraying chamber, said spraying chamber being provided with a perforated lateral wall, a top sprayer provided with an upper perforated wall, a nozzle projecting from said lateral wall, separate conduits connecting said spraying chamber, top sprayer and nozzle with said supply chamber, and manually operated means for independently controlling said conduits.

4. A unitary discharge device adapted to be connected to a hose comprising a casing having a water supply chamber, separate irrigating devices connected thereto by separate passages, said devices including a lateral sprayer, a top sprayer and a lateral nozzle and manually operated means for independently controlling said passages.

In testimony whereof I have signed my name to this specification.

EDWARD J. VONDENBOSCH.

Copies of this patent may be obtained for five cents each, by addressing the "Commissioner of Patents, Washington, D. C."